J. G. WILSON.
Domestic Boiler.
No. 110,884.
Patented Jan. 10, 1871.
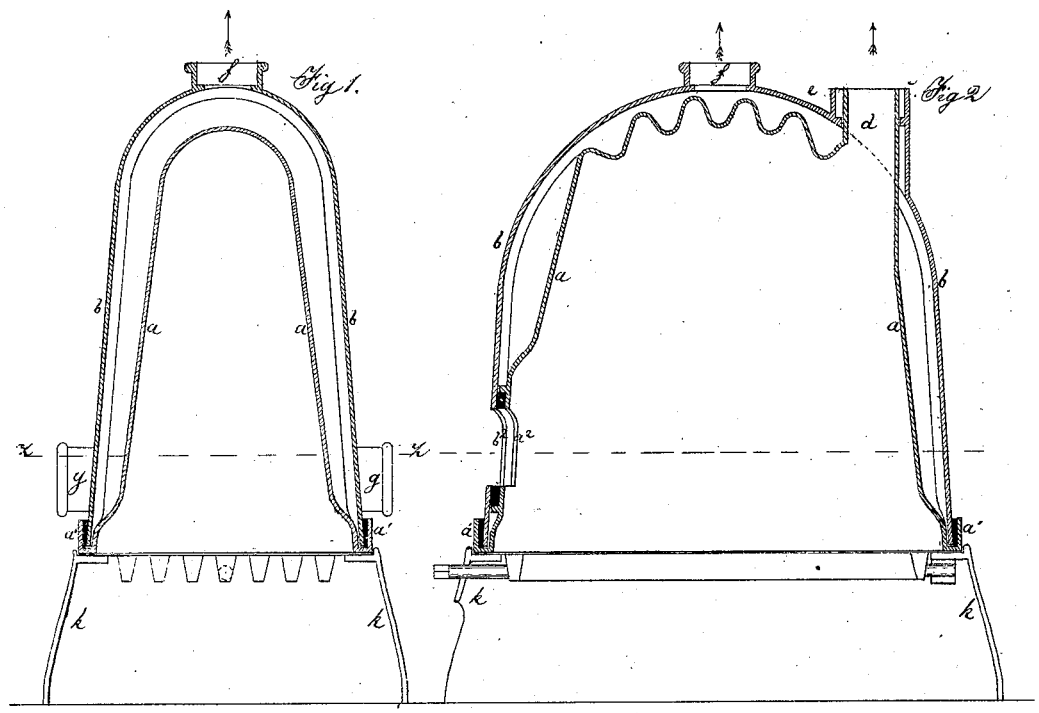
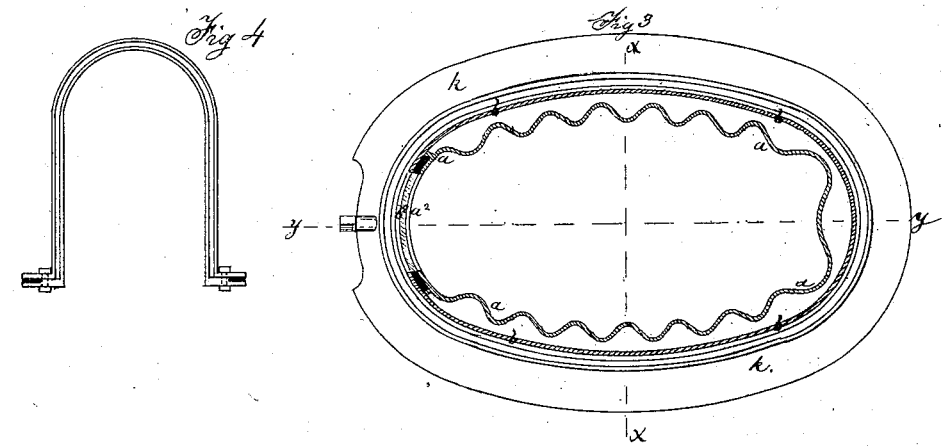
Witnesses.
Albert H Hook
R. C. Overton
Inventor:
John G Wilson

United States Patent Office.

JOHN G. WILSON, OF NEW YORK, N. Y.

Letters Patent No. 110,884, dated January 10, 1871.

IMPROVEMENT IN BOILERS FOR HEATING.

The Schedule referred to in these Letters Patent and making part of the same.

I, JOHN G. WILSON, of the city, county, and State of New York, have invented certain Improvements in the Construction of Cast-iron Boilers for heating purposes, of which the following is a specification.

Nature and Object of the Invention.

The first part of my invention relates to the peculiar shape of the two shells of which the boiler is composed, to make a cheap and effective boiler.

The second part consists in a novel bottom joint, by which the two shells are connected, which joint is not alone adaptable to my boiler, but also to all cast-iron boilers for heating purposes now being manufactured.

Description of the Accompanying Drawing.

Figure 1 is a vertical section of the boiler in line $x$ $x$ of fig. 3.

Figure 2, a vertical section thereof in line $y$ $y$ of fig. 3.

Figure 3, a horizontal section thereof in line $z$ $z$ of fig. 1.

Figure 4, a vertical section of a boiler with a bottom joint made in the ordinary manner.

All cast-iron boilers for heating purposes are composed of two shells—an inner and an outer shell. The space between the two shells is filled with water, and the fire is inside the inner shell; and, in order to increase the fire-surface of the inner shell, many devices have been resorted to, most of which require the same to be composed of many parts, which necessitates separate joints. To avoid this, and construct an effective and economical boiler with not more than three joints, I make the inner shell $a$ corrugated, the corrugations running over the top of the shell $a$, and down the sides to somewhere near the bottom edge, where the said shell $a$ terminates in a plain elliptic form.

The outer shell $b$ is of a plain elliptic shape, rounded on top, and conforming with the general outline of the inner shell, but without corrugations, leaving a water-space between the two shells.

The manner of jointing the outer and inner shells heretofore adopted exclusively consists, as shown in fig. 4, in furnishing each shell, at its bottom edge, with a horizontal flange, which flanges are then riveted or bolted together, and calked.

My improved mode of jointing the two shells together does away with all bolts and rivets, and consists in providing a vertical groove at the lower portion of the inner shell $a$ by casting all around it a vertical rim, $a^1$, concentric with the shell $a$, and the bottom edge of the outer shell $b$ is placed into the aforesaid groove, and there calked with iron cement, thus making a water-tight joint.

Both shells are made with a corresponding aperture, $a^2$ and $b^2$, for the fire-door, and the joint around this aperture is made in the ordinary manner.

The smoke-pipe $d$ is cast together with the inner shell $a$, and ought to be as far to the rear as possible, and passes through a nozzle, $e$, cast onto the outer shell, where it is jointed by calking, also in the ordinary manner.

The hot water passes off through a nozzle, $f$, at the top of the outer shell, and returns back into the boiler by a nozzle, $g$, at the lower portion of the outer shell.

Both shells so jointed and placed upon a cast-iron base, $k$, that will serve as an ash-pit, make a cheap and effective portable boiler, and requires no masonry.

By forming the tops of the outer shell so as to afford a steam-space, the apparatus can be made to serve as a steam-boiler for heating purposes.

I claim as my invention—

1. A boiler composed of a plain elliptic outside shell and a corrugated inside shell, being jointed at their bottom edges, around the aperture for the fire-door, and around the smoke-pipe, substantially as described.

2. The manner of forming a bottom joint between the outer and inner shells of a cast-iron boiler, substantially as specified.

JOHN G. WILSON.

Witnesses:
ALBERT H. HOOK,
R. C. OVERTON.